(12) United States Patent
Zhang et al.

(10) Patent No.: US 12,165,318 B2
(45) Date of Patent: *Dec. 10, 2024

(54) SYSTEMS AND METHODS FOR ACCURATE AND RAPID POSITRON EMISSION TOMOGRAPHY USING DEEP LEARNING

(71) Applicant: Subtle Medical, Inc., Menlo Park, CA (US)

(72) Inventors: Tao Zhang, Menlo Park, CA (US); Enhao Gong, Menlo Park, CA (US)

(73) Assignee: Subtle Medical, Inc., Menlo Park, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 17/675,814

(22) Filed: Feb. 18, 2022

(65) Prior Publication Data

US 2022/0343496 A1 Oct. 27, 2022

Related U.S. Application Data

(63) Continuation of application No. PCT/US2020/047022, filed on Aug. 19, 2020.
(Continued)

(51) Int. Cl.
*G06T 7/00* (2017.01)
*G06T 7/70* (2017.01)

(52) U.S. Cl.
CPC .............. *G06T 7/0012* (2013.01); *G06T 7/70* (2017.01); *G06T 2207/10104* (2013.01);
(Continued)

(58) Field of Classification Search
CPC ..... A61B 6/037; A61B 6/5229; G06F 18/214; G06F 18/251; G06N 3/045; G06N 3/048;
(Continued)

(56) References Cited

U.S. PATENT DOCUMENTS 8,175,360 B2   5/2012  Razifar et al.
11,182,878 B2  11/2021 Zhang et al.
(Continued)

FOREIGN PATENT DOCUMENTS

JP       2011053210 A    3/2011
WO    WO-2021041125 A1  3/2021

OTHER PUBLICATIONS

Chen Xi Noise reduction for short time PET imaging with conventional and deep learning based methods May 2019 (Year: 2019).*
(Continued)

*Primary Examiner* — Nizar N Sivji
(74) *Attorney, Agent, or Firm* — Wilson Sonsini Goodrich & Rosati

(57) ABSTRACT

A computer-implemented method is provided for improving image quality with shortened acquisition time. The method comprises: determining an accelerated image acquisition parameter for imaging a subject using a medical imaging apparatus; acquiring, using the medical imaging apparatus, a medical image of the subject according to the accelerated image acquisition parameter; applying a deep network model to the medical image to generate a corresponding transformed medical image with improved quality; and combining the medical image and the corresponding transformed medial image using an adaptive mixing algorithm to generate output image.

18 Claims, 9 Drawing Sheets

Related U.S. Application Data

(60) Provisional application No. 62/891,062, filed on Aug. 23, 2019.

(52) U.S. Cl.
CPC ............... *G06T 2207/20004* (2013.01); *G06T 2207/20081* (2013.01); *G06T 2207/20084* (2013.01); *G06T 2207/20216* (2013.01); *G06T 2207/20221* (2013.01)

(58) Field of Classification Search
CPC .. G06N 3/088; G06T 5/00; G06T 5/60; G06T 7/0012; G06T 7/70; G06T 11/008; G06T 2207/10104; G06T 2207/20004; G06T 2207/20081; G06T 2207/20084; G06T 2207/20216; G06T 2207/20221; G06T 2211/441; G06T 2211/444; G06V 10/40; G06V 30/194; G06V 2201/03
See application file for complete search history.

(56) References Cited

U.S. PATENT DOCUMENTS

| | | |
|---|---|---|
| 2014/0066759 A1 | 3/2014 | Healey |
| 2017/0018061 A1 | 1/2017 | Meyers et al. |
| 2017/0039706 A1* | 2/2017 | Mikhno ............... A61B 6/501 |
| 2017/0200067 A1* | 7/2017 | Zhou .................... G06V 30/194 |
| 2018/0293762 A1* | 10/2018 | Fu ......................... G06T 11/006 |
| 2018/0315188 A1* | 11/2018 | Tegzes ................. G06T 7/11 |
| 2019/0108441 A1* | 4/2019 | Thibault .............. G01N 23/046 |
| 2019/0122073 A1* | 4/2019 | Ozdemir ............... G06V 20/56 |
| 2019/0347772 A1 | 11/2019 | Zhang et al. |
| 2020/0074231 A1* | 3/2020 | Ishii ...................... G06N 20/00 |
| 2020/0074632 A1* | 3/2020 | Heindl .................. G16H 30/20 |
| 2020/0097773 A1* | 3/2020 | Hsieh .................... G06N 3/045 |
| 2020/0134571 A1* | 4/2020 | Demick ............... G06V 30/416 |
| 2020/0151922 A1* | 5/2020 | Xu ........................ A61B 6/5282 |
| 2021/0042883 A1 | 2/2021 | Zhang et al. |
| 2021/0056734 A1* | 2/2021 | Han ...................... A61B 5/7267 |
| 2022/0130084 A1* | 4/2022 | Litwiller ............... G06T 11/008 |

OTHER PUBLICATIONS

An End-to-End Recurrent Neural Network for Radial MR Image Reconstruction—2022 (Year: 2022).*
Beyer T, et al. A combined PET/CT scanner for clinical oncology. Journal of Nuclear Medicine 2000; 41:1369-1379.
Chen K, et al. Ultra-low-dose 18F-Florbetaben Amyloid PET imaging using deep learning with multi-contrast MRI inputs. Radiology 2018;290:649-656 .
Litjens G, et al. A survey on deep learning in medical image analysis. Medical Image Analysis 2017; 42:60-88.
Mullani NA, et al. System design of fast PET scanners utilizing time-of-flight. IEEE Transactions on Nuclear Science 1981; vol. NS-28, 1:104-108.
Ouyang J, et al. Ultra-low-dose PET Reconstruction using Generative Adversarial Network with Feature Matching and Task-Specific Perceptual Loss, Medical Physics 2019 46(8)3555-3564.
PCT/US20/47022 Search Report & Written Opinion dated Nov. 9, 2020.
Xiang L, et al. Deep auto-context convolutional neural networks for standard-dose PET image estimation from low-dose PET/MRI. Neurocomputing 2017; 267:406-416.
Cheng et al. Accelerated Iterative Image Reconstruction Using a Deep Learning Based Leapfrogging Strategy. Jun. 2017. 27 pages.
EP20857740.3 Extended European Search Report dated Aug. 4, 2023.
Xi, Chen et al. Noise reduction for short time PET imaging with conventional and deep learning based methods. The Journal of Nuclear Medicine, May 2019. 60 (supplement 1), 239. 4 pages.

* cited by examiner

SYSTEMS AND METHODS FOR ACCURATE AND RAPID POSITRON EMISSION TOMOGRAPHY USING DEEP LEARNING

CROSS-REFERENCE TO RELATED APPLICATION

This application claims priority to U.S. Provisional Application No. 62/891,062 filed on Aug. 23, 2019, the content of which is incorporated herein in its entirety.

BACKGROUND

Positron Emission Tomography (PET) is a medical imaging technique commonly used in applications such as cancer diagnosis, tumor detection and early diagnosis of neurological disorders. PET provides clinical images with high specificity at cellular level. PET uses small amounts of radiotracers to provide functional imaging. Combined with Computed Tomography (CT) or Magnetic Resonance (MR), PET (PET/CT or PET/MR) is widely applied in clinics for diagnosis of cancers, cardiovascular diseases, neurological disorders, and other disorders, as well as assessment of the effectiveness of treatment plans. Compared with other modalities (e.g., X-ray, CT or ultrasound) PET usually takes longer time, sometimes tens of minutes, for data acquisition to generate clinically useful images. PET image quality depends on collecting a sufficient number of coincidence events from annihilation photon pairs. Undesirable imaging artifacts as well as misplacement of events in space may appear due to the long scan time and the undesired movement of patient during the scan. The prolonged acquisition time may lead to inaccuracies in PET radiotracer quantification. The lengthy exam time may also make the procedure uncomfortable for patients who have difficulty staying still. Such long scan time for PET exams may result in high imaging cost and limit the patient volume and accessibility.

SUMMARY

The present disclosure provides improved Positron Emission Tomography (PET) systems and methods that can address various drawbacks of conventional systems, including those recognized above. Methods and systems of the presenting disclosure capable of providing improved image quality with shortened image acquisition time. In particular, PET images with improved quality may be obtained at shortened acquisition time without losing quantification accuracy.

Traditionally, short scan duration may result in low counting statistics in the image frame and image reconstruction from the low-count projection data can be challenging due to the tomography is ill-posed and high noise. The provided methods and systems may significantly reduce PET scan time by applying deep learning techniques so as to mitigate imaging artifacts and improve image quality. Examples artifacts in medical imaging may include noise (e.g., low signal noise ratio), blur (e.g., motion artifact), shading (e.g., blockage or interference with sensing), missing information (e.g., missing pixels or voxels in painting due to removal of information or masking), and/or reconstruction (e.g., degradation in the measurement domain).

The methods and systems provided herein may allow for faster PET imaging acquisition while preserving quantification accuracy related to physiological or biochemical information. For example, methods and systems of the present disclosure may provide accelerated PET image acquisition while preserving accuracy in PET uptake quantification. In some embodiments, accurate PET quantification with accelerated acquisition may be achieved by leveraging machine learning techniques and the biochemical information (e.g., radioactivity distribution) in the original input PET data using an adaptive mixing algorithm for image reconstruction.

In an aspect, a computer-implemented method is provided for improving image quality with shortened acquisition time. The method comprises: (a) acquiring, using a medical imaging apparatus, a medical image of a subject, wherein the medical image is acquired using an accelerated image acquisition parameter; (b) applying a deep network model to the medical image to generate a corresponding transformed medical image with improved quality; and (d) combining the medical image and the corresponding transformed medical image to generate an output image.

In another related yet separated aspect, a non-transitory computer-readable storage medium including instructions that, when executed by one or more processors, cause the one or more processors to perform operations. The operations comprise: (a) acquiring, using a medical imaging apparatus, a medical image of a subject, wherein the medical image is acquired using an accelerated image acquisition parameter; (b) applying a deep network model to the medical image to generate a corresponding transformed medical image with improved quality; and (d) combining the medical image and the corresponding transformed medical image to generate an output image.

In some embodiments, the medical image and the corresponding transformed medical image are dynamically combined based at least in part on an accuracy of the medical image. In other embodiments, the medical image and the corresponding transformed medical image are spatially combined. In some cases, the medical image and the corresponding transformed medical image are combined using ensemble averaging.

In some embodiments, the medical image and the corresponding transformed medical image are combined using an adaptive mixing algorithm. In some cases, the adaptive mixing algorithm comprises calculating a weighting coefficient for the medical image and the corresponding transformed medical image. In some instances, the weighting coefficient is calculated based on one or more parameters quantifying an accuracy of the transformed medical image. For example, the one or more parameters quantifying the accuracy of the transformed medical image is selected from the group consisting of standardized uptake value (SUV), local peak value of SUV, maximum value of SUV, and mean value of SUV. Alternatively, the weighting coefficient is calculated based on both an image quality and quantification accuracy of the medical image and the corresponding transformed medical image.

In some embodiments, the medical image is Positron Emission Tomography (PET) image.

Additionally, methods and systems of the present disclosure may be applied to existing systems without a need of a change of the underlying infrastructure. In particular, the provided methods and systems may accelerate PET scan time at no additional cost of hardware component and can be deployed regardless of the configuration or specification of the underlying infrastructure.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein) of which:

DETAILED DESCRIPTION

Figure 1:
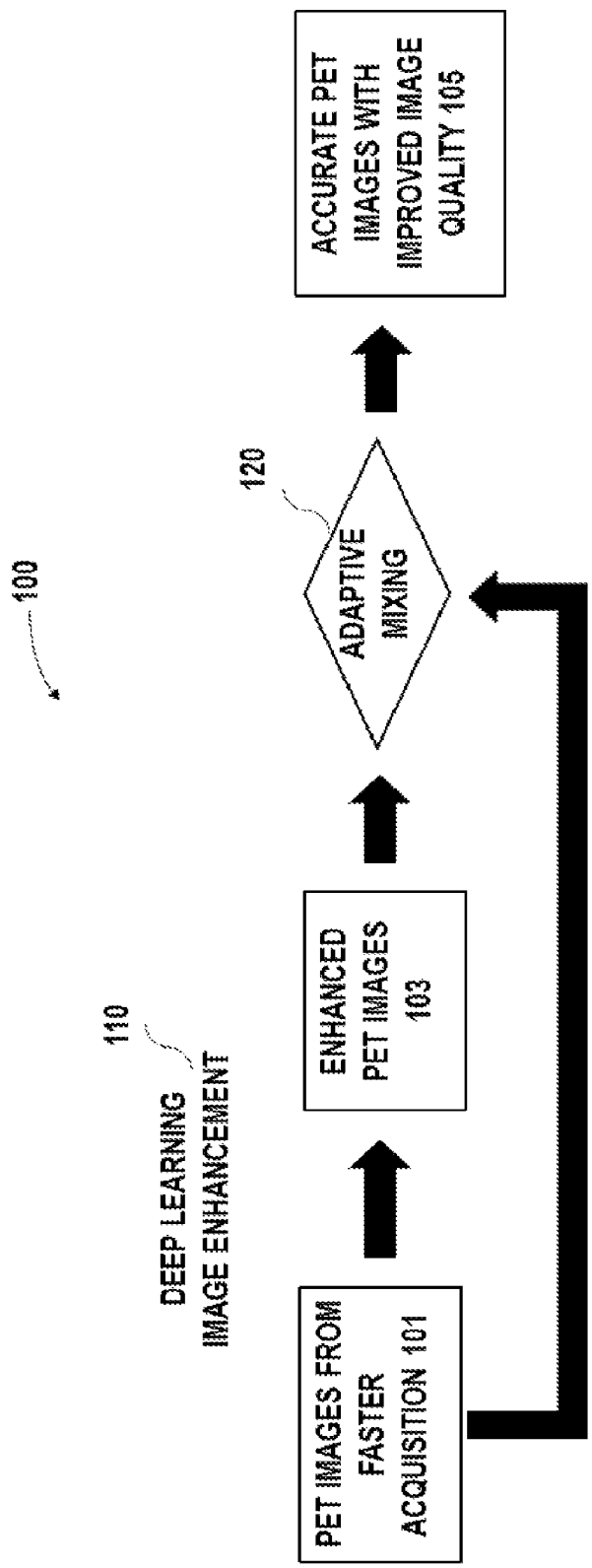
FIG. 1 shows an example of a workflow for processing and reconstructing PET image data.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Positron Emission Tomography (PET) is a nuclear medicine functional imaging technique that is used to observe metabolic processes in the body as an aid to the diagnosis of disease. A PET system may detect pairs of gamma rays emitted indirectly by a positron-emitting radioligand, most commonly fluorine-18, which is introduced into a patient body on a biologically active molecule such as a radioactive tracer. The biologically active molecule can be any suitable type such as fludeoxyglucose (FDG). With tracer kinetic modeling, PET is capable of quantifying physiologically or biochemically important parameters in regions of interest or voxel-wise to detect disease status and characterize severity.

Though positron emission tomography (PET) and PET data examples are primarily provided herein, it should be understood that the present approach may be used in other imaging modality contexts. For instance, the presently described approach may be employed on data acquired by other types of tomographic scanners including, but not limited to, computed tomography (CT), single photon emission computed tomography (SPECT) scanners, functional magnetic resonance imaging (fMRI), or magnetic resonance imaging (MRI) scanners.

The term "accurate quantification" or "quantification accuracy" of PET imaging may refer to the accuracy of quantitative biomarker assessment such as radioactivity distribution. Various metrics can be employed for quantifying the accuracy of PET image such as standard uptake value (SUV) for an FDG-PET scan. For example, peak SUV value may be used as metric for quantifying accuracy of the PET image. Other common statistics such as mean, median, min, max, range, skewness, kurtosis, and more complex values, such as metabolic volume above an absolute SUV of 5 standardized uptake value (SUV) of 18-FDG, can also be calculated and used for quantifying the accuracy of PET imaging.

The term "shortened acquisition," as used herein, generally refers to shortened PET acquisition time or PET scan duration. The provided systems and methods may be able to achieve PET imaging with improved image quality by an acceleration factor of at least 1.5, 2, 3, 4, 5, 10, 15, 20, a factor of a value above 20 or below 1.5, or a value between any of the two aforementioned values. An accelerated acquisition can be achieved by shortening the scan duration of a PET scanner. For example, an acquisition parameter (e.g., 3 min/bed, 18 min in total) may be set up via the PET system prior to performing a PET scan.

PET images taken under short scan duration may have low image quality (e.g., high noise) due to low coincident-photon counts detected in addition to various physical degradation factors. Example of sources of noise in PET may include scatter (a detected pair of photons, at least one of which was deflected from its original path by interaction with matter in the field of view, leading to the pair being assigned to an incorrect line of response (LOR)) and random events (photons originating from two different annihilation events but incorrectly recorded as a coincidence pair because their arrival at their respective detectors occurred within a coincidence timing window. Methods and systems of the present disclosure may improve the quality of the medical image while preserving the quantification accuracy without modification to the physical system.

FIG. 1 shows an example of a workflow 100 for processing and reconstructing PET image data. As described above, shortened scan time may be setup in the PET scanner or on the PET system. The acquired images 101 under the shortened scan time or faster acquisition may have lower image quality due to reduced scanning time per image. For example, the PET images 101 may have low image resolution and/or signal to noise ratio (SNR) due to the accelerated acquisition as described above. The PET images 101 may be acquired by complying with an existing or conventional scan protocol such as metabolic volume calibration or interinstitutional cross-calibration and quality control. The PET images 101 may be acquired and reconstructed using any conventional reconstruction techniques without requiring additional changes to the PET scanner. The PET images 101 acquired with shortened scan duration may also be referred to as fast-scanned image or original input image which can be used interchangeably throughout the specification.

The aforementioned PET images 101 as obtained by an accelerated acquisition may have lower image quality. For example, image resolution and signal to noise ratio (SNR) may be lower due to low coincident-photon counts detected in addition to various physical degradation factors. The input PET images 101 may suffer from artifacts that may include noise (e.g., low signal noise ratio), blur (e.g., motion artifact), shading (e.g., blockage or interference with sensing), missing information (e.g., missing pixels or voxels in painting due to removal of information or masking), reconstruction (e.g., degradation in the measurement domain), sharpness and various other artifacts that may lower the quality of the image. In addition to the accelerated acquisition factor, other sources may also introduce noise in PET imaging which may include scatter (a detected pair of photons, at least one of which was deflected from its original path by interaction with matter in the field of view, leading to the pair being assigned to an incorrect LOR) and random events (photons originating from two different annihilation events but incorrectly recorded as a coincidence pair because their arrival at their respective detectors occurred within a coincidence timing window.

The PET images 101 may be reconstructed image obtained using any existing reconstruction method. For example, the PET images 101 may be reconstructed using filtered back projection, statistical, likelihood-based approaches, and various other conventional methods. However, the PET images 101 may still have low image quality such as low resolution and/or low SNR due to the shortened acquisition time and reduced number of detected photons.

Image quality of the fast-scanned PET image 101 may be improved using deep learning techniques so that quality enhanced PET images 103 can be achieved. In some embodiments, deep learning techniques may be utilized for enhancing the image quality. For instance, during the image enhancement process 110, a deep learning algorithm may be applied to estimate a function $f$ that transforms the fast-scanned, low quality image $x_{fast}$ to a high quality image $\tilde{x}$. For example, the fast-scanned PET images 101 with low image quality may be supplied to a model network as input, and the output of the model network comprises the enhanced PET images. For instance, the enhanced PET image 103 generated by the model network may have an improved SNR and/or higher resolution compared to the original input PET image 101.

A trained deep learning model may be used for transforming the input image data with lower quality into PET image data with higher quality. In some embodiments, the input data may be 2D image data. In some cases, the input data may be 3D volume comprising multiple axial slices. The input PET images 101 may be sinogram data collected by the PET scanner. With aid of the provided system, higher quality PET images may be obtained with shortened acquisition duration.

The model network may be a trained model for enhancing the quality of PET images. In some embodiments, the model may include an artificial neural network that can employ any type of neural network model, such as a feedforward neural network, radial basis function network, recurrent neural network, convolutional neural network, deep residual learning network and the like. In some embodiments, the machine learning algorithm may comprise a deep learning algorithm such as convolutional neural network (CNN). Examples of machine learning algorithms may include a support vector machine (SVM), a naïve Bayes classification, a random forest, a deep learning model such as neural network, or other supervised learning algorithm or unsupervised learning algorithm. The model network may be a deep learning network such as CNN that may comprise multiple layers. For example, the CNN model may comprise at least an input layer, a number of hidden layers and an output layer. A CNN model may comprise any total number of layers, and any number of hidden layers. The simplest architecture of a neural network starts with an input layer followed by a sequence of intermediate or hidden layers, and ends with output layer. The hidden or intermediate layers may act as learnable feature extractors, while the output layer in this example provides PET images with improved quality (e.g., enhanced PET images 103). Each layer of the neural network may comprise a number of neurons (or nodes). A neuron receives input that comes either directly from the input data (e.g., low quality image data, fast-scanned PET data, etc.) or the output of other neurons, and performs a specific operation, e.g., summation. In some cases, a connection from an input to a neuron is associated with a weight (or weighting factor). In some cases, the neuron may sum up the products of all pairs of inputs and their associated weights. In some cases, the weighted sum is offset with a bias. In some cases, the output of a neuron may be gated using a threshold or activation function. The activation function may be linear or non-linear. The activation function may be, for example, a rectified linear unit (ReLU) activation function or other functions such as saturating hyperbolic tangent, identity, binary step, logistic, arcTan, softsign, parameteric rectified linear unit, exponential linear unit, softPlus, bent identity, softExponential, Sinusoid, Sinc, Gaussian, sigmoid functions, or any combination thereof.

In some embodiments, the model for enhancing image quality may be trained using supervised learning. For example, in order to train the deep learning network, pairs of fast-scanned PET images with low quality (i.e., acquired under reduced time) and standard/high quality PET images as ground truth from multiple subjects may be provided as training dataset. As described above, the model is trained to approximate a transformation function $f$ that transforms the fast-scanned, low quality image $x_{fast}$ to a high quality image $\tilde{x}$. The high-quality output image may be an image with high SNR or high resolution. This function $f$ may be obtained by optimizing metrics between the ground truth image $x$, obtained by standard PET imaging which is not shortened and the estimated image $\tilde{x}$ through a training process on a number of training datasets.

In some embodiments, the model may be trained using unsupervised learning or semi-supervised learning that may not require abundant labeled data. High quality medical image datasets or paired dataset can be hard to collect. In some cases, the provided method may utilize unsupervised training approach allowing the deep learning method to train and apply on existing datasets (e.g., unpaired dataset) that are already available in clinical database. In some embodiments, the training process of the deep learning model may employ residual learning method. In some cases, the network structure can be a combination of U-net structure and a residual network. Details about the training process are described later herein.

Next, the enhanced PET image 103 may be further processed for improving quantification accuracy. In some situations, the enhanced PET images 103 may be over-smoothed or losing small structures (e.g., due to the L2 norm used as the cost function) during the image quality enhancement process. In some embodiments, the enhanced PET image 103 may be fused with the original input PET images 101 to generate accurate PET images with improved image quality 105. The original input PET images 101 may contain useful biochemical information (e.g., preserve lesion uptake) despite the lower image quality. Such original biochemical information may be utilized by the present method and system for preserving or improving the quantification accuracy of the PET images. For example, the original biochemical information from the original image may be beneficially combined with the enhanced PET image thereby allowing for an output PET image with both improved image quality and accuracy.

The method 100 may apply an adaptive mixing algorithm 120 to generate output image 105 with both high image quality and high quantification accuracy. In some cases, the enhanced PET image data 103 and the original input PET image data 101 may be combined using an adaptive mixing algorithm such that the overall performance of the output image data 105 is improved over that of the enhanced image 103 and/or the original input PET image 101. For example, the quantification accuracy of the output image 105 may be improved over that of the enhanced image 103 while the image quality is improved over that of the original input PET image 101. In some cases, the quantification accuracy of the output image may be improved over both the enhanced image and the original input PET image given that random variations may be reduced during the image processing such as normalization or filtering.

As shown in FIG. 1, the output enhanced images generated by the neural network and the original input images may be mixed 120. In some cases, the original input PET images 101 and the enhanced PET images 103 may be mixed in a dynamic fashion. For example, the mixing function may be a weighted combination of the deep learning enhanced image $\tilde{x}$ 103 and the original input image $x_{fast}$ 101 where the weights or coefficient are dynamically calculated based on one or more parameters quantifying the accuracy of PET image. The parameters may be selected based on the type of tracer and/or region of interest (ROI). Any suitable parameters can be selected for quantifying the accuracy of PET image such as standardized uptake value (SUV) for an FDG-PET scan. Other metrics such as (local) peak value of SUV, maximum value of SUV, mean value of SUV or any combination of the above may be used as parameters for quantifying accuracy of the PET image and for determining the weighting coefficients. Any common statistics such as mean, median, min, max, range, skewness, kurtosis, and more complex values, such as metabolic volume above an absolute SUV of 5 standardized uptake value (SUV) of 18-FDG, can also be used for quantifying the accuracy of PET imaging and for determining the weighting coefficients.

The mixing of the enhanced image $\tilde{x}$ 103 and the original input image $x_{fast}$ 101 may be spatially and/or intensity adaptive. For example, the adaptive mixing may be achieved by applying spatially varying filters. The original input image 101 and the quality enhanced images 103 may be spatially averaged. The averaging operator may be an ensemble averaging. The averaging operator may be a weighted averaging of original input image $x_{fast}$ and the enhanced quality image $\tilde{x}$ in a selected region (e.g., ROI) or across the entire image frame.

In some cases, the output of the adaptive mixing and deep learning system y[i,j] 105 can be obtained according to the following formula:

$$y[i, j] = \sum_{i=1}^{k} f_i(x)[i, j]\alpha_i(\phi f_1(x)[i, j], \ldots, \phi f_k(x)[i, j]) + \left(1 - \sum \alpha_i\right)x[i, j]$$

wherein x represents the original input image (e.g., $x_{fast}$), $f_i(x)$ represents the output of the deep learning network (e.g., $\tilde{x}$), and $\alpha_i$ represents the weighting factor for each of k different outputs of the deep learning network. As shown in the above example, each weighting factor $\alpha_i$ may be determined based on the output of the deep learning network $f_i(x)$. In some cases, the weighting factor may be a function of the deep-learning-enhanced image (i.e., output of the deep learning network). The function can be any transformation function such as a linear or nonlinear max-filter.

The weighting factor value or weighting coefficient can be spatially-adaptive and intensity-adaptive such that the quality and accuracy of the PET images may be optimized. For example, if the peak value of SUV changes significantly in the deep learning enhanced image (compared to the original input image), the original input image may be assigned a greater weighting coefficient in terms of SUV thereby preserving the accuracy feature. In some cases, the adaptive weighting coefficient for adaptive mixing of images may be determined based on a pre-determined relationship to one or more parameters for quantifying accuracy (e.g., peak SUV, mean SUV) as described above. For example, the adaptive weighting factors for adaptive mixing of images may be selected to preserve the maximum value of the quantification factors such as SUV. In some cases, the adaptive weighting coefficient for adaptive mixing of images may be determined based on both the metrics on image quality and the metrics on quantification accuracy. For example, the weighting coefficient in the weighting average may be determined based on metrics on image quality, such as peak signal to noise ratio (PSNR) or structural similarity index (SSIM), and multi-scale the structural similarity index (MS-SSIM) or normalized root mean square error (NRMSE), and quantification parameters such as SUV or maximum value of SUV.

In some cases, the weighting coefficients may be determined in real-time. For example, the weighting coefficients may be calculated upon capturing of a new set of input data. Alternatively or in addition to, the weighting coefficients may be determined per scanner, per system, per examination, per patient, per model, per a pre-determined period of time and the like. For instance, the weighting coefficient may be determined by comparing the image quality metrics (e.g., PSNR, SSIM, RMSE) between the ground-truth data and the quality enhanced image while preserving the peak-SUV to maintain the local peak value. As an example, the weighting coefficients may be determined by tuning the values to minimize a value of the goal function RMSE ($f_i(x)$, ground-truth)+RMSE (max_filter($f_i(x)$), max_filter(ground-truth)). The weighting coefficients may be determined during a training phase, after deployment of the model, after implementing the model network or during a continual improvement stage of the system.

Figure 2:
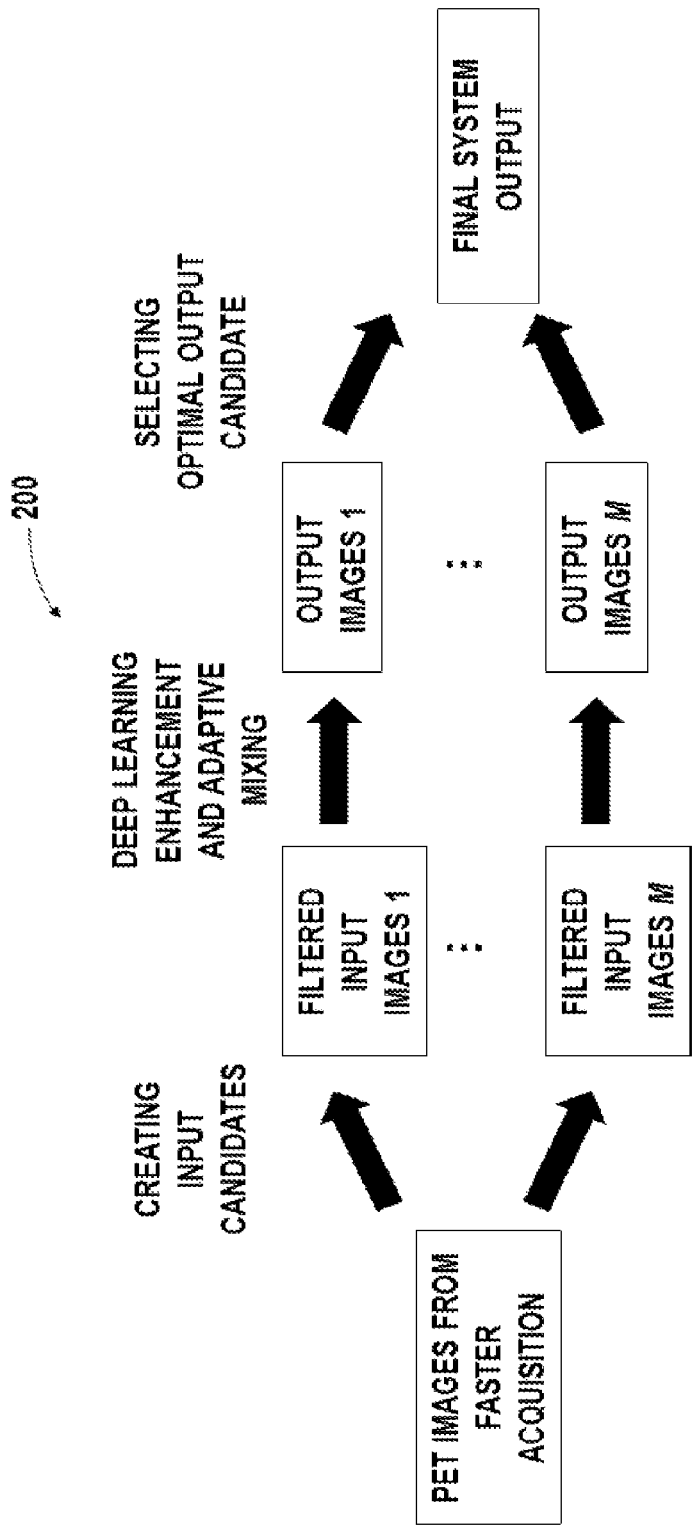
FIG. 2 shows an example method for improving the performance of methods and systems described consistent herein.

In some cases, a method may be provided to further improve the performance of the system. The method may involve pre-processing PET images prior to quality enhancement using a variety of different filtering parameters and identifying the optimal output image. FIG. 2 shows an exemplary method 200 for improving the performance of methods and systems consistent with the disclosed methods and systems described with respect to FIG. 1. In the illustrated example, a variety of filters may be applied to the low quality images obtained from accelerated PET images prior to improving the image quality through the deep learning network. Non-limiting examples of these filters can be convolutional filters (for example Roberts edge enhancing filter, Gaussian smoothing filter, Gaussian sharpening filter, Sobel edge detection filter, etc.) or morphological filters (for example erosion, dilation, segmentation filters, etc.) or various other filters. These filters may enhance image parameters such as SNR or resolution. Other methods for improving image quality such as methods making use of local patch statistics, prior anatomical or temporal information, denoising methods, such non-local mean denoising, guided image filtering, entropy or mutual information based methods, segmentation based methods and gradient based methods as described above can also be used. As a result, multiple filtered input images (e.g., filtered input image 1, . . . m) are created. Each filtered input image set may then be processed by the deep learning network and the adaptive mixing methods as described in FIG. 1. As a result, multiple output candidates may be generated for each image. Next, an optimal output image candidate may be selected from the plurality of output candidates. The selection criterion can be based on image quality metrics such as SNR, image sharpness, resolution or others and any combination of the above. In some cases, upon identifying the optimal output image candidate, the associated filter (e.g., filter parameters), weighting coefficients for adaptive mixing and other parameters for processing data in the process 200 may be adopted and utilized for processing ongoing input data.

System Overview

Figure 3:
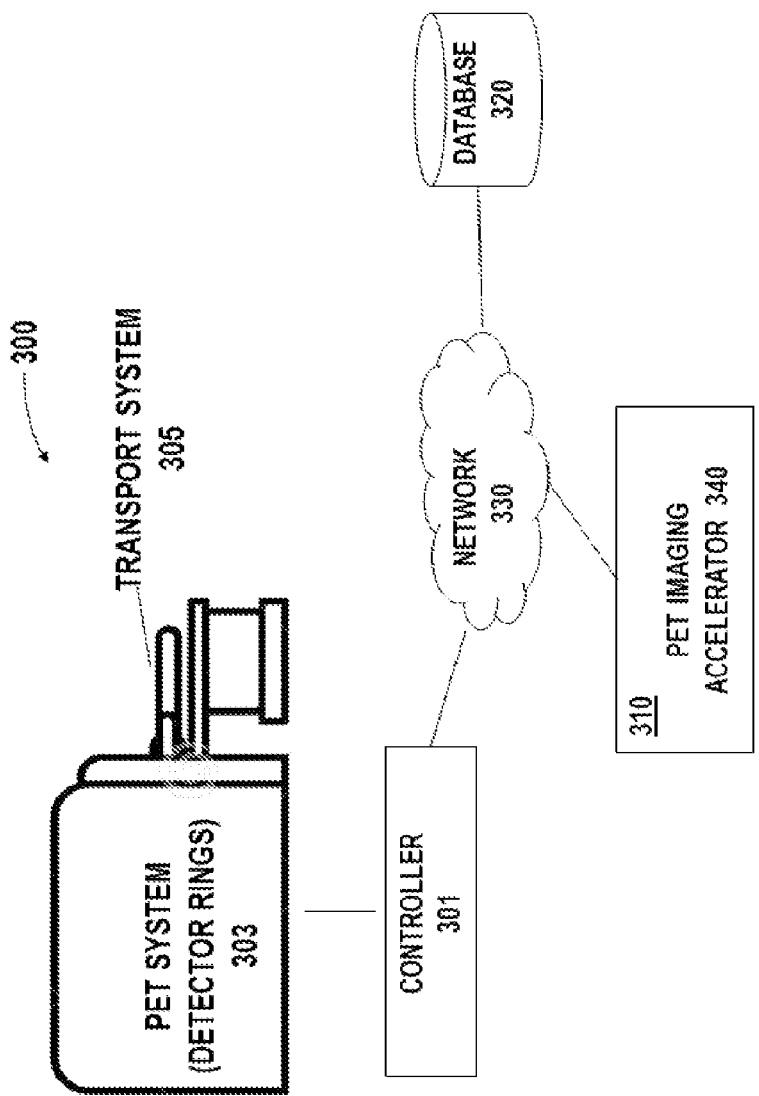
FIG. 3 schematically illustrates an exemplary PET platform in which an imaging accelerator can be implemented.

The systems and methods can be implemented on an existing PET imaging system without a need of a change of hardware infrastructure. FIG. 3 schematically illustrates an example PET platform 300 in which an imaging accelerator 340 of the presenting disclosure may be implemented. The PET system 300 may comprise a detector ring system 303, a patient transport table 305 connected to the detector ring system, and a controller 301 operably coupled to the detector ring system. In one example, a patient may lie on the patient transport table 305 and the detector ring system 303 may surround at least a portion of patient's body. The PET platform 300 can be combined with other imaging modalities to form, for example, a PET/CT or a PET/MRI platform. Suitable methods such as co-registering images may be involved for integrating the PET platform into another imaging modality (e.g., CT, MRI). The PET platform 300 may further comprise a computer system 310 and one or more databases operably coupled to the controller 301 over the network 330. The computer system 310 may be used for further implementing the methods and systems explained above to improve the quality of images.

The controller 301 may be a coincidence processing unit. The controller may comprise or be coupled to an operator console (not shown) which can include input devices (e.g., keyboard) and control panel and a display. For example, the controller may have input/output ports connected to a display, keyboard and printer. In some cases, the operator console may communicate through the network with the computer system 310 that enables an operator to control the production and display of images on a screen of display. The images may be images with improved quality and/or accuracy acquired according to an accelerated acquisition scheme. The image acquisition scheme may be determined automatically by the PET imaging accelerator 340 and/or by a user as described later herein.

The PET system may comprise a user interface. The user interface may be configured to receive user input and output information to a user. The user input may be related to controlling or setting up an image acquisition scheme. For example, the user input may indicate scan duration (e.g., the min/bed) for each acquisition or scan time for a frame that determines one or more acquisition parameters for an accelerated acquisition scheme. The user input may be related to the operation of the PET system (e.g., certain threshold settings for controlling program execution, image reconstruction algorithms, etc). The user interface may include a screen such as a touch screen and any other user interactive external device such as handheld controller, mouse, joystick, keyboard, trackball, touchpad, button, verbal commands, gesture-recognition, attitude sensor, thermal sensor, touch-capacitive sensors, foot switch, or any other device.

The PET platform 300 may comprise computer systems 310 and database systems 320, which may interact with a PET imaging accelerator 340. The computer system may comprise a laptop computer, a desktop computer, a central server, distributed computing system, etc. The processor may be a hardware processor such as a central processing unit (CPU), a graphic processing unit (GPU), a general-purpose processing unit, which can be a single core or multi core processor, or a plurality of processors for parallel processing. The processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations. Details regarding the computer system are described with respect to FIG. 4.

The PET platform 300 may comprise one or more databases. The one or more databases 320 may utilize any suitable database techniques. For instance, structured query language (SQL) or "NoSQL" database may be utilized for storing PET image data, raw collected data, reconstructed image data, training datasets, trained model (e.g., hyper parameters), adaptive mixing weighting coefficients, etc. Some of the databases may be implemented using various standard data-structures, such as an array, hash, (linked) list, struct, structured text file (e.g., XMVL), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present disclosure is implemented as a data-structure, the use of the database of the present disclosure may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

The network 330 may establish connections among the components in the PET platform and a connection of the PET system to external systems. The network 330 may comprise any combination of local area and/or wide area networks using both wireless and/or wired communication systems. For example, the network 330 may include the Internet, as well as mobile telephone networks. In one embodiment, the network 330 uses standard communications technologies and/or protocols. Hence, the network 330 may include links using technologies such as Ethernet, 802.11, worldwide interoperability for microwave access (WiMAX), 2G/3G/4G mobile communications protocols, asynchronous transfer mode (ATM), InfiniBand, PCI Express Advanced Switching, etc. Other networking protocols used on the network 330 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

Figure 4:
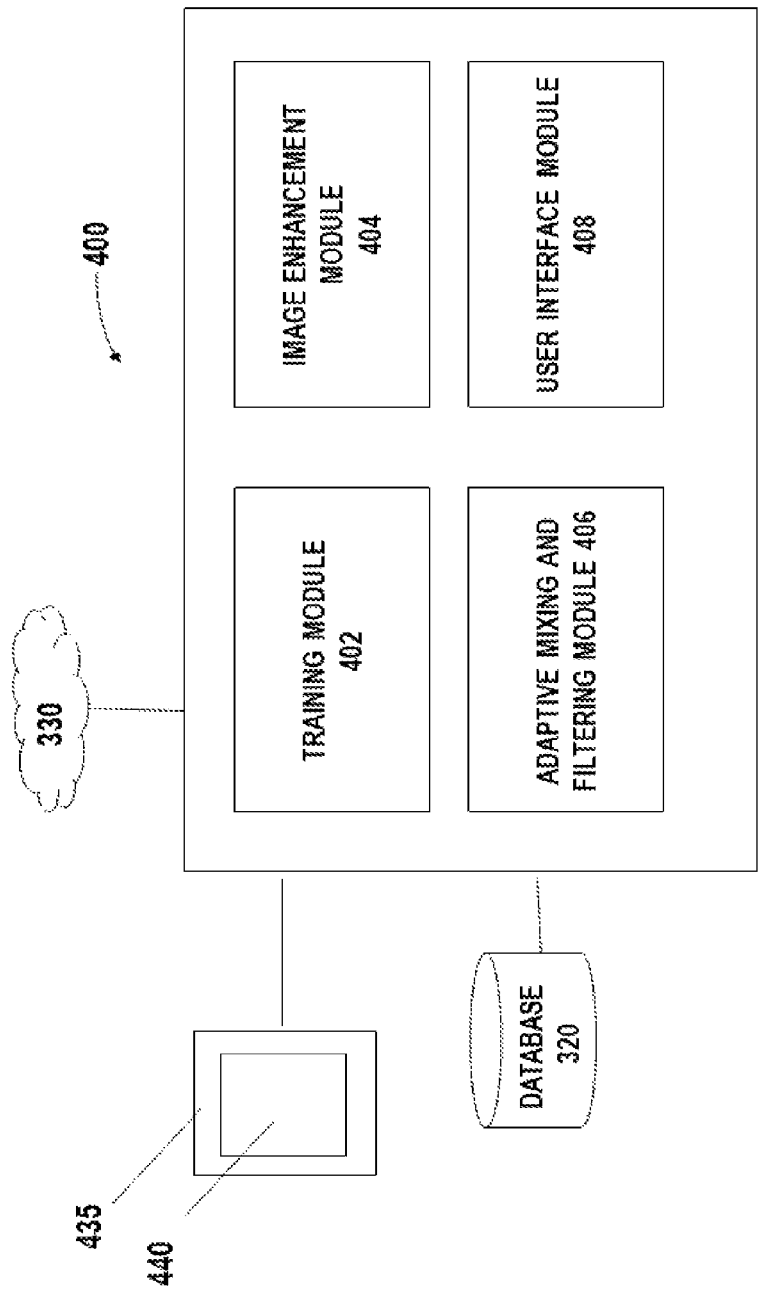
FIG. 4 shows a block diagram of an exemplary PET imaging accelerator system, in accordance with embodiments of the present disclosure.

FIG. 4 shows a block diagram of an exemplary PET imaging accelerator system 400, in accordance with embodiments of the present disclosure. The PET imaging accelerator system 400 may comprise multiple components, including but not limited to, a training module 402, an image enhancement module 404, an interactive PET acquisition module 406 and a user interface module 408.

The training module 402 may be configured to obtain and manage training datasets. For example, the training datasets may comprise pairs of standard acquisition and shortened acquisition images from same subject. The training module 402 may be configured to train a deep learning network for enhancing the image quality as described elsewhere herein. For example, the training module may employ supervised training, unsupervised training or semi-supervised training techniques for training the model. The training module may be configured to implement the machine learning methods as described elsewhere herein. The training module may train a model off-line. Alternatively or additionally, the training module may use real-time data as feedback to refine the model for improvement or continual training. In some cases, the training module may implement the method described in FIG. 2 to further improve the performance of the system by pre-determining a set of parameters for generating an optimal output for a given PET scanner, a patient, a test, a period of test time and the like.

The image enhancement module 404 may be configured to enhance image quality using a trained model obtained from the training module. The image enhancement module may implement the trained model for making inferences, i.e., generating PET images with improved quality. For instance, the image enhancement module may take one or more fast-scanned PET image data collected from a PET scanner as input and output PET image data with improved quality. In some cases, the image enhancement module and/or the adaptive mixing and filtering module 406 may implement the method as described in FIG. 2 to further improve the performance of the system.

The interactive PET acquisition module 406 may be operably coupled to a controller of the PET system. The interactive PET acquisition module 406 may be configured to generate an acquisition time or acquisition speed, such as the total duration of imaging, scan duration per frame or the minutes per bed (min/bed) for each acquisition. In some cases, the interactive PET acquisition module may receive a user input indicating a desired acquisition time (e.g., acquisition speed, etc). in some cases, in response to receiving the target or desired acceleration, the interactive PET acquisition module may run tests on one or more acquisition speeds and determine an optimal acquisition speed. The optimal acquisition speed may be determined based on a predetermined rule. For instance, the optimal acquisition speed may be determined based on the quality of the output image. For example, an acquisition speed meeting the target acceleration speed while providing the best quality images may be selected. In some cases, the interactive PET acquisition module may allow a user to define an acquisition speed. In response to receiving a user defined acquisition speed, the interactive PET acquisition module may run simulations and generate output images associated with the acquisition speed. A user may or may not further adjust the acquisition speed so as to change the quality or other characteristics of the output images. The determined acquisition speed may then be transmitted to the controller of the PET system for controlling the operation of the imaging system as described elsewhere herein. In some cases, the interactive PET acquisition module may be operably coupled to the user interface module 408 for receiving user input and outputting an auto-generated acquisition speed or simulated images. In some cases, the interactive PET acquisition module 406 may also be operably coupled to the image enhancement module and/or the adaptive mixing and filtering module 406 for performing simulations as described above.

The computer system 400 may be programmed or otherwise configured to manage and/or implement an enhanced PET imaging system and its operations. The computer system 400 may be programmed to implement methods consistent with the disclosure herein.

The computer system 400 may include a central processing unit (CPU, also "processor" and "computer processor" herein), a graphic processing unit (GPU), a general-purpose processing unit, which can be a single core or multi core processor, or a plurality of processors for parallel processing. The computer system 400 can also include memory or memory location (e.g., random-access memory, read-only memory, flash memory), electronic storage unit (e.g., hard disk), communication interface (e.g., network adapter) for communicating with one or more other systems, and peripheral devices 435, 320, such as cache, other memory, data storage and/or electronic display adapters. The memory, storage unit, interface and peripheral devices are in communication with the CPU through a communication bus (solid lines), such as a motherboard. The storage unit can be a data storage unit (or data repository) for storing data. The computer system 400 can be operatively coupled to a computer network ("network") 330 with the aid of the communication interface. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 400, can implement a peer-to-peer network, which may enable devices coupled to the computer system 400 to behave as a client or a server.

The CPU can execute a sequence of machine-readable instructions, which can be embodied in a program or software. The instructions may be stored in a memory location, such as the memory. The instructions can be directed to the CPU, which can subsequently program or otherwise configure the CPU to implement methods of the present disclosure. Examples of operations performed by the CPU can include fetch, decode, execute, and writeback.

The CPU can be part of a circuit, such as an integrated circuit. One or more other components of the system can be included in the circuit. In some cases, the circuit is an application specific integrated circuit (ASIC).

The storage unit can store files, such as drivers, libraries and saved programs. The storage unit can store user data, e.g., user preferences and user programs. The computer system 300 in some cases can include one or more additional data storage units that are external to the computer system, such as located on a remote server that is in communication with the computer system through an intranet or the Internet.

The computer system 400 can communicate with one or more remote computer systems through the network 330. For instance, the computer system 400 can communicate with a remote computer system of a user or a participating platform (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 300 via the network 330.

Methods as described herein can be implemented by way of machine (e.g., computer processor) executable code stored on an electronic storage location of the computer system 400, such as, for example, on the memory or electronic storage unit. The machine executable or machine readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 300, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 400 can include or be in communication with an electronic display 435 that comprises a user interface (UI) 440 for providing, for example, displaying reconstructed images or acquisition speeds. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit. For example, some embodiments use the algorithm illustrated in FIG. 1, FIG. 2 and FIG. 5 or other algorithms provided in the associated descriptions above.

Figure 5:
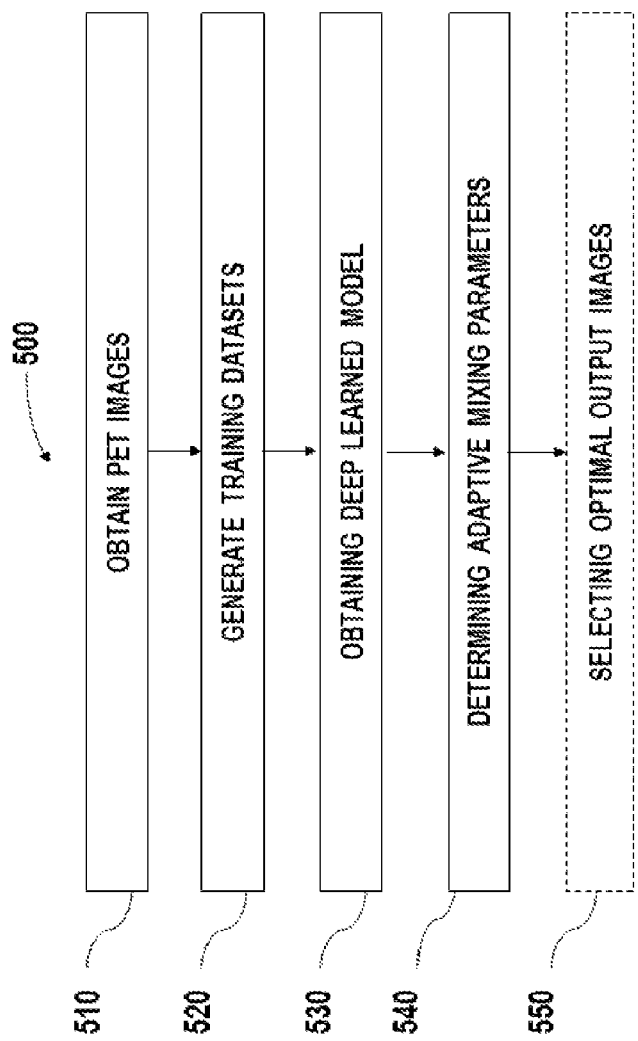
FIG. 5 illustrates an example of method for improving PET image quality and preserving quantification accuracy with accelerated acquisition.

FIG. 5 illustrates an exemplary process 500 for improving PET image quality and/or accuracy with accelerated acquisition. A plurality of PET images may be obtained from PET imaging system (operation 510) for training a deep learning model. The plurality of PET images for forming a training dataset can also be obtained from external data sources (e.g., clinical database, etc).

The PET images may be used to form training datasets (operation 520). In some embodiments, the training dataset may comprise pairs of relatively lower quality image data from accelerated PET acquisition and corresponding higher quality image data (i.e., ground truth). In some cases, the training dataset may comprise augmented datasets obtained from simulation. For instance, image data from clinical database may be used to generate low quality image data mimicking the image data acquired with shortened scan time. In an example, noise may be added to raw image data to mimic image data reconstructed from low-count projection data. Similarly, higher quality input image data may be obtained from direct image acquisition with longer acquisition time. In some cases, the higher quality image data (e.g., ground-truth data) may be obtained using methods described herein to improve the reconstruction performance. For example, methods based on prior information or longer san time may be employed. Example methods may include but not limited to, methods making use of local patch statistics, prior anatomical or temporal information, denoising methods, such as non-local mean denoising, guided image filtering, Gaussian filtering, entropy or mutual information based methods, segmentation based methods and gradient based methods and the like.

Alternatively or in addition to, un-paired training dataset may be utilized. In some cases, the network model may be trained without or with little labeled data. For example, the deep learning network models may be trained on both paired datasets and un-paired datasets which beneficially provides flexibility in data collection. The training datasets may comprise paired datasets including a reference image with high quality and an the corresponding fast-scanned image with lower quality, and un-paired datasets which may include image data from which unsupervised features may be extracted. For example, the un-paired data may be supplied to the model system for training an autoencoder to extract unsupervised features. In some cases, the un-paired dataset may be used for further enhancing the performance of a model trained on paired dataset.

The training step 530 may comprise a deep learning algorithm consistent with the disclosure herein. In some cases, the deep learning algorithm may be a convolutional neural network. As described above, the training process may involve supervised learning, unsupervised learning, semi-supervised learning or a combination of the above.

In some cases, the paired datasets may be used in supervised training. In some embodiments, the model for enhancing image quality may be trained using supervised learning. For example, in order to train the deep learning network, pairs of fast-scanned PET images with low quality (i.e., acquired under reduced time) and standard/high quality PET images as ground truth from multiple subjects may be provided as training dataset. As described above, the model is trained to approximate a transformation function $f$ that transforms the fast-scanned, low quality image $x_{fast}$ to a high quality image $\tilde{x}$. The high quality output image may be high SNR or high resolution image. This function $f$ may be obtained by optimizing metrics between the ground truth image x, obtained by standard PET imaging which is not shortened and the estimated image $\tilde{x}$ through a training process on a number of training datasets.

The loss function or cost function for optimizing the classifier can be of any type of function such as L1 loss (i.e., mean absolute error), L2 loss (i.e., mean square error), Lp loss and various other supervised loss. There can be one or multiple cost metrics which may be combined with optimized weightings. g can be any suitable metrics such as $l_2$ norm $\|k(x)-k(\tilde{x})\|_2$, $l_1$ norm $\|k(x)-k(\tilde{x})\|_1$, structural dissimilarity or other metrics. In some cases, k can be identity transform then the metrics are calculated in image domain. k can be any other transforms, such as Fourier transform, therefore the metrics are calculated in corresponding domain. In some cases, the g metric may be used as criteria during the training process of the deep learning model. In some cases, the g metrics can also be a network model that is separately or simultaneously trained together with f, to discriminate image states and evaluate image quality. In some cases, the deep learning model may be trained with adaptively optimized metrics based on user input and real-time simulated output images.

In some embodiments, the training process of the deep learning model may employ a residual learning method. In some instances, the residual learning framework may be used for evaluating a trained model. In some instances, the residual learning framework with skip connections may generate estimated ground-truth images from the low quality images such as PET image collected under accelerated acquisition, with refinement to ensure it is consistent with measurement (data consistency). In some cases, what the model learns is the residual of the difference between the fast-scanned image data and ground-truth image data, which is sparser and less complex to approximate using the network structure. The method may use by-pass connections to enable the residual learning. In some cases, a residual network may be used and the direct model output may be the estimated residual/error between the fast-scanned image (i.e., input image) and the enhanced image. In other word, the function to be learned by the deep learning framework is a residual function which in some situations may be easy to optimize. The enhanced image can be recovered by adding the input image to the residual. This residual training approach may reduce the complexity of training and achieve better performance where the output level is small.

In some cases, the deep learning model may be trained with adaptively tuned parameters based on user input and real-time estimated output images. Alternatively or in addition to, the deep learning network may be a "plain" CNN that does not involve residual learning. In some cases, during the training process, the deep learning model may adaptively tune model parameters to approximate the enhanced PET image data from an initial set of the input images, and outputting the enhanced PET image data.

In some cases, training the network model may comprise further enhancing the model using un-paired datasets. In some cases, a supervised learning and unsupervised learning may be performed sequentially. In some situations unsupervised algorithms may introduce instability during training. To avoid such instability, it is beneficial to train a model using supervised training with paired datasets then further enhance the model using unsupervised learning. For example, the model may be initially trained to estimate a transformation from a fast-scanner image to an enhanced image using supervised losses such as pixel-wise L1 and/or L2 losses. The performance of the resulting model may not be good enough due to limitation of the supervised losses and the amount of available paired dataset. The model may be further improved by unsupervised learning or a combination of unsupervised and supervised learning. For example, the model can be further refined or enhanced using refinement losses such as a mixed loss of supervised losses (e.g., L1 loss, L2 loss, Lp loss, structural similarity, perceptual losses, etc) and unsupervised losses (e.g., GAN (Generative Adversarial Network) loss, least-square GAN, WGAN losses (Wasserstein GAN), etc).

There can be multiple iterations in a training process. In each of the multiple iterations, different supervised losses, unsupervised losses or combinations of supervised losses and unsupervised losses may be selected. In an iteration of the process, supervised and unsupervised learning techniques may be applied sequentially or concurrently. The un-paired datasets may be used for unsupervised training which enables the method to further train and apply on most or all existing PET datasets. In some cases, the system and/or methods may employ Cycle Generative Adversarial Network (Cycle-GAN) that further enables improved performance and more flexible training on both paired datasets and un-paired datasets. A Cycle-GAN may be used in adversarial training in which a discriminative network is used to enhance the primary network. The primary network may be generative (segmentation, synthesis) or discriminative (classification). The machine learnt network may further be configured as a U-net. The U-net is an auto-encoder in which the outputs from the encoder-half of the network are concatenated with the mirrored counterparts in the decoder-half of the network. The U-net may replace pooling operations by upsampling operators thereby increasing the resolution of the output.

In a step 540, parameters such as weighting coefficients for the adaptive mixing algorithm may be determined. The adaptive mixing algorithm and the process for determining the weighting coefficients can be the same as those described elsewhere herein. In some cases, the weighting coefficients may be calculated or determined dynamically in real-time based on the input PET image data. Alternatively or in addition to, the weighting coefficients may be calculated based on empirical data or pre-determined prior to implementing the method in the physical platform. In some cases, the network model and/or the parameters of the adaptive mixing algorithm may be further tuned or refined with data collected from the PET system after implementation or deployment. Once the parameters are determined, enhanced images from the training step and the fast-scanned images may be adaptively mixed and filtered in order to obtain images with improved image quality while preserving quantification accuracy.

In optional embodiments, an optimal output may be selected by applying a variety of filtering or quality improving methods to the input image data. The step of identifying optimal output data (operation 550) and/or the associated parameters for pre-processing the data prior to applying the deep learning model can be the same as those described in FIG. 2.

Although FIG. 5 shows a method in accordance with some embodiments, a person of ordinary skill in the art will recognize that there are many adaptations for various embodiments. For example, the operations can be performed in any order. Some of the operations may be precluded, some of the operations may be performed concurrently in one step, some of the operations may be repeated, and some of the operations may comprise sub-steps of other operations. For example, the parameters of the adaptive mixing algorithm can be determined concurrent with or prior to training deep learning model. The method may also be modified in accordance with other aspects of the disclosure as provided herein.

EXAMPLE DATASETS

Figure 6:
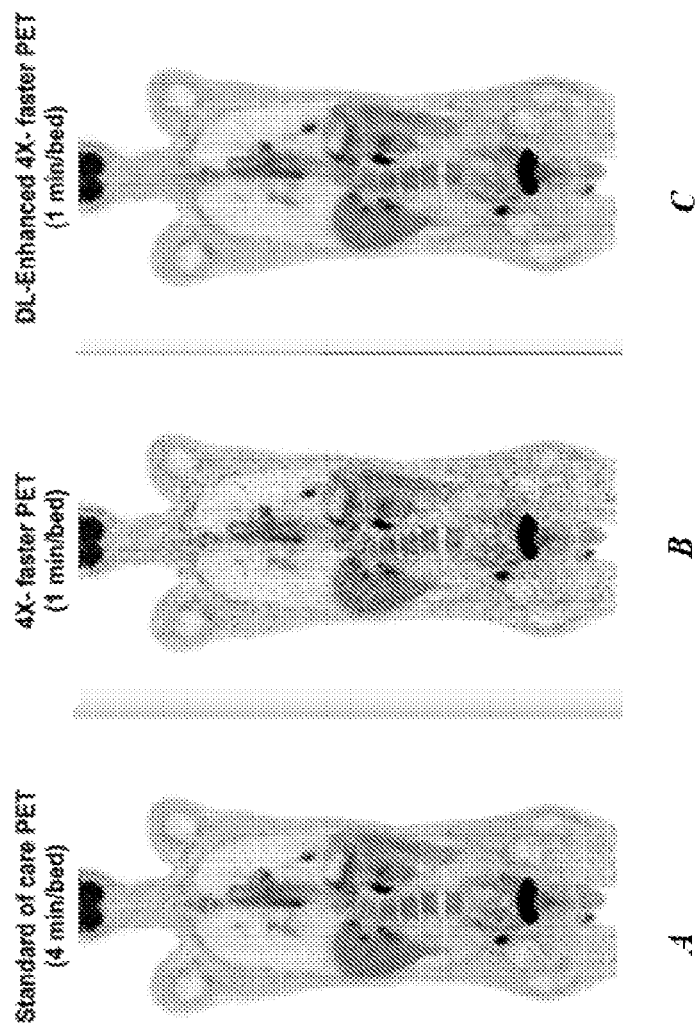
FIG. 6 shows PET images taken under standard acquisition time (Scenario A), with accelerated acquisition (Scenario B), and the image inn Scenario B processed by the provided methods and systems (Scenario C).

FIG. 6 shows PET images taken under standard acquisition time (Scenario A), with accelerated acquisition (Scenario B), and the fast-scanned image processed by the provided methods and systems (Scenario C). Scenario A shows a standard PET image with no enhancement or shortened acquisition time. The acquisition time for this example is 2 minutes per bed (min/bed). This image may be used in training the deep learning network as an example of the ground truth. Scenario B shows an example of a PET image with shortened acquisition time. In this example the acquisition time is accelerated by 4 times and the acquisition time is reduced to 1 min/bed. The fast-scanned image present lower image quality such as high noise. This image may be an example of the second image used in pairs of images for training the deep learning network. Scenario C shows an example of an improved quality image which the methods and systems of the present disclosure are applied to. The image quality has substantially improved and comparable to the standard PET image quality.

Example 1

Figure 7:
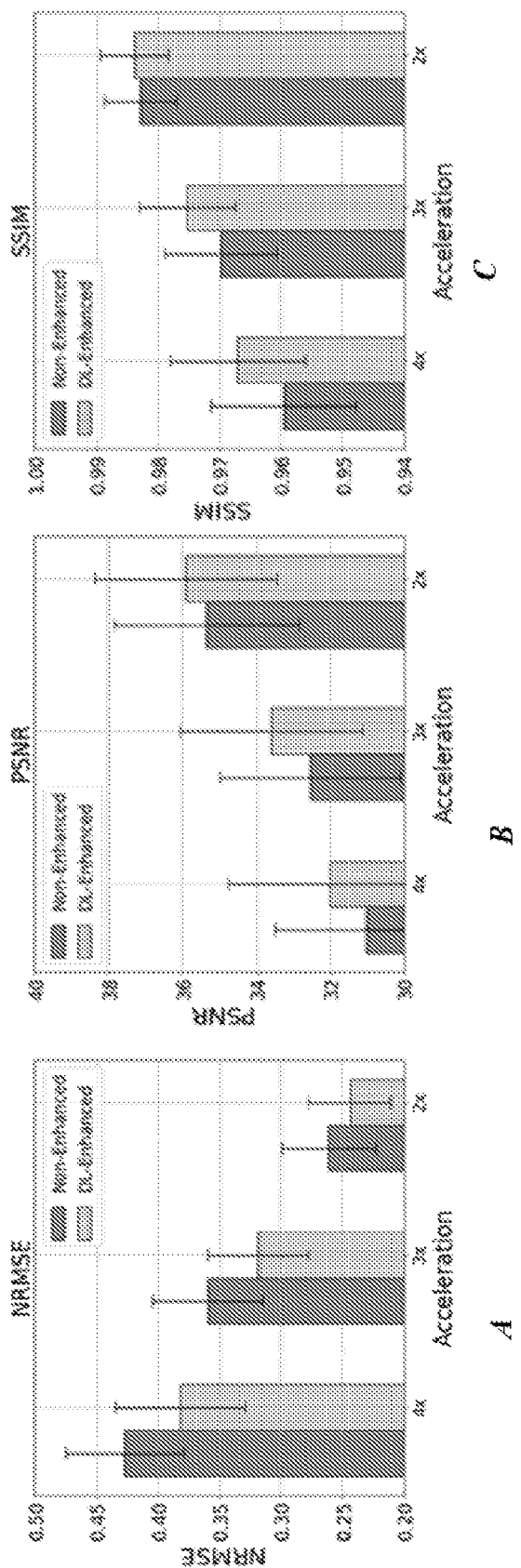
FIG. 7 shows examples of image quality metrics for different acceleration factors.

FIG. 7 shows the analytic results of a study. In this study, seven subjects (5 males, age: 57:14 years, weight: 81±10 Kgs) referred for a whole-body fludeoxyglucose-18 (FDG-18) PET/CT scan on a GE Discovery 710 scanner were recruited for the study following IRB approval and informed consent. The standard of care was a 2 min/bed PET acquisition acquired in list-mode. 2-fold, 3-fold, and 4-fold accelerated acquisitions were synthesized using the first 30 seconds (s), 40 s, and 60 s list-mode PET counts of the original 2 min acquisition. Quantitative image quality metrics such as normalized root-mean-squared-error (NRMSE), peak signal to noise ratio (PSNR), and structural similarity (SSIM) were calculated for all enhanced and non-enhanced accelerated PET scans, with the standard 2 min acquisition as the ground-truth. The results are shown in FIG. 7A-C. Better image quality may be achieved using the methods and systems in the present disclosure.

Example 2

Figure 8:
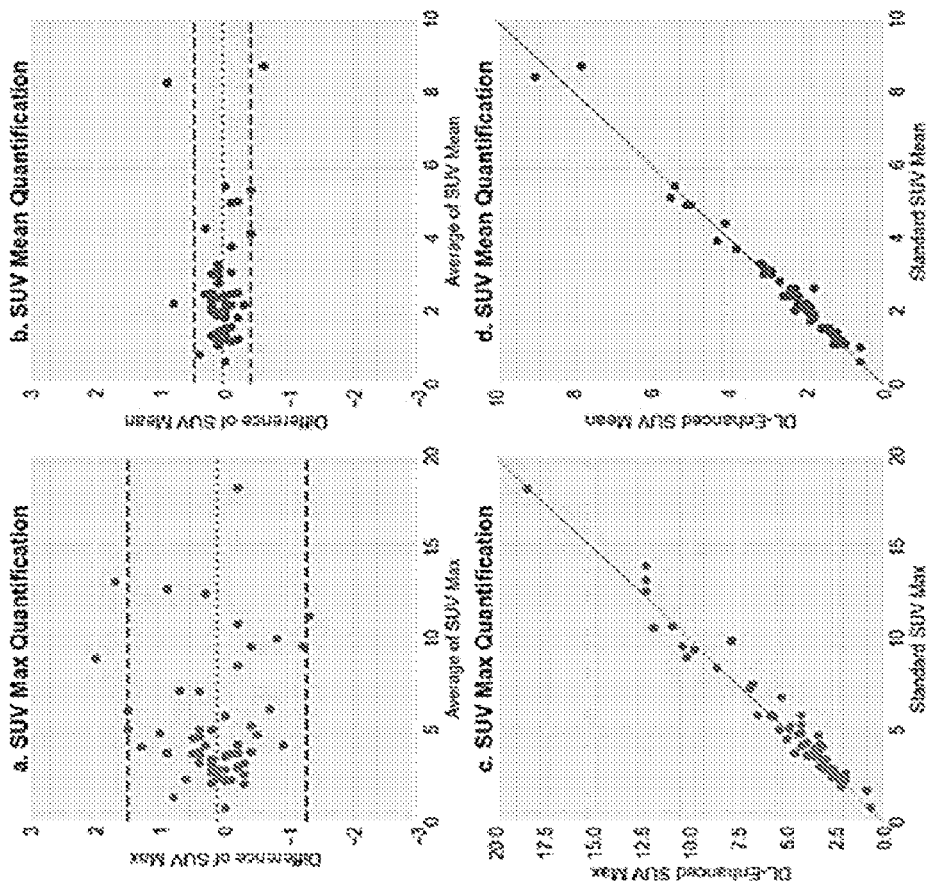
FIG. 8 shows examples of accuracy of quantification measure such as standard uptake value (SUV) using methods and systems in the present disclosure.

FIG. 8 shows the results of a study. In this study, 15 subjects (7 male, 8 female; mean age: 67 years, range: 45-85 years, average BMI: 30, range: 19-48) referred for clinical whole-body PET/CT exams underwent two separate PET scans, one with the standard acquisition duration (3 mins/abed) followed by one acquired 4 times faster (45 s/bed), following IRB approval and informed consent. The 4 times faster PET images were enhanced using the proposed methods and systems in the present disclosure. One nuclear medicine physician reviewed the standard acquisition PET images, identified possible lesions and some normal regions, and drew regions of interest (ROIs). The same lesions were reviewed on the quality enhanced images from the shortened acquisition time images and the ROIs from the standard acquisition were propagated to the deep learning enhanced 4 times faster (deep-learning-enhanced 4× faster) scan.

Quantitative mean and maximum SUV values per ROI between the standard and deep-learning-enhanced four times faster acquisitions were visualized using Bland-Altman tests and compared using concordance correlation coefficients (CCC), linear regressions, and Mann-Whitney U-Tests. A total of 63 ROIs were identified in the standard acquisition PET images. The Bland-Altman plot in subplot a and subplot b (dotted line indicating mean, and dashed line indicating 95% limits of agreement) shows minimal differences between SUVs obtained from the two sets of scans, with almost all values contained within the 95% limits of agreement interval. CCC and linear Pearson coefficient values of 0.99 for both SUV-max and SUV-mean indicates very strong agreement between the SUV values from standard acquisition and deep-learning-enhanced scan (subplot c and subplot d, where the dotted line indicates the unity line). This is further indicated by the lack of statistical significance of p=0.68 for SUV-max and p=0.77 for SUV-mean values using the Mann-Whitney U-Test.

Example 3

Figure 9:
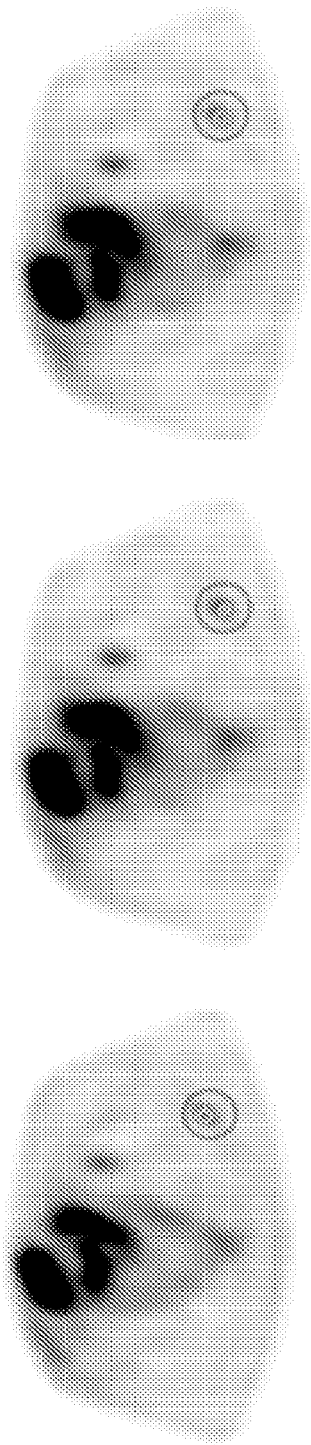
FIG. 9 shows a comparison between ground-truth image (scenario A), image enhanced with deep learning without adaptive mixing (scenario B) and enhanced image processed with adaptive mixing (scenario C).

FIG. 9 shows a comparison between ground-truth image (scenario A), image enhanced with deep learning without adaptive mixing (scenario B) and enhanced image processed with adaptive mixing (scenario C). As shown in the result, the quantification accuracy (e.g., peak SUV) of the quality enhanced images with adaptive mixing (e.g., scenario C) is better than that of the quality enhanced images without adaptive mixing. For example, the peak SUV of the ROI in scenario C is 2.626 which is greater than the peak SUV 2.532 in the same ROI in scenario B and is closer to the ground-truth result.

As used herein, "or" is inclusive and not exclusive, unless expressly indicated otherwise by context. Therefore, "A or B" means "A, B, or both," unless expressly indicated otherwise or indicated otherwise by context. Moreover, "and" is both joint and several, unless expressly indicated otherwise or indicated otherwise by context.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for improving image quality with shortened acquisition time, comprising:
    (a) acquiring, using a medical imaging apparatus, a medical image of a subject, wherein the medical image is acquired using an accelerated image acquisition parameter with a first image quality;
    (b) applying a deep network model to the medical image to generate a corresponding transformed medical image with a second image quality, wherein the second image quality is improved over the first image quality in at least one of image resolution, signal to noise ratio, motion artifact, and shading; and
    (c) combining at least physiological or biochemical information from the medical image with the corresponding transformed medical image to generate an output image, wherein the output image has a quantification accuracy enhanced over a quantification accuracy of the transformed medical image or an image quality enhanced over the first image quality of the medical image, wherein one or more parameters quantifying the quantification accuracy of the transformed medical image is selected from the group consisting of standardized uptake value (SUV), local peak value of SUV, maximum value of SUV, and mean value of SUV.

2. The computer-implemented method of claim 1, wherein the medical image and the corresponding transformed medical image are dynamically combined based at least in part on a quantification accuracy of the medical image.

3. The computer-implemented method of claim 1, wherein the medical image and the corresponding transformed medical image are spatially combined.

4. The computer-implemented method of claim 3, wherein the medical image and the corresponding transformed medical image are combined using ensemble averaging.

5. The computer-implemented method of claim 1, wherein the medical image and the corresponding transformed medical image are combined using an adaptive mixing algorithm.

6. The computer-implemented method of claim 5, wherein the adaptive mixing algorithm comprises calculating a weighting coefficient for the medical image and the corresponding transformed medical image.

7. The computer-implemented method of claim 6, wherein the weighting coefficient is calculated based on one or more parameters quantifying the quantification accuracy of the transformed medical image.

8. The computer-implemented method of claim 6, wherein the weighting coefficient is calculated based on both an image quality and a quantification accuracy of the medical image and the corresponding transformed medical image.

9. The computer-implemented method of claim 1, wherein the medical image is Positron Emission Tomography (PET) image.

10. A non-transitory computer-readable storage medium including instructions that, when executed by one or more processors, cause the one or more processors to perform operations comprising:
    (a) acquiring, using a medical imaging apparatus, a medical image of a subject, wherein the medical image is acquired using an accelerated image acquisition parameter with a first image quality;
    (b) applying a deep network model to the medical image to generate a corresponding transformed medical image with a second image quality, wherein the second image quality is improved over the first image quality in at least one of image resolution, signal to noise ratio, motion artifact, and shading; and
    (c) combining at least physiological or biochemical information from the medical image with the corresponding transformed medical image to generate an output image, wherein the output image has a quantification accuracy enhanced over a quantification accuracy of the transformed medical image or an image quality enhanced over the first image quality of the medical image, wherein one or more parameters quantifying the quantification accuracy of the transformed medical image is selected from the group consisting of standardized uptake value (SUV), local peak value of SUV, maximum value of SUV, and mean value of SUV.

11. The non-transitory computer-readable storage medium of claim 10, wherein the medical image and the corresponding transformed medical image are dynamically combined based at least in part on a quantification accuracy of the medical image.

12. The non-transitory computer-readable storage medium of claim 10, wherein the medical image and the corresponding transformed medical image are spatially combined.

13. The non-transitory computer-readable storage medium of claim 12, wherein the medical image and the corresponding transformed medical image are combined using ensemble averaging.

14. The non-transitory computer-readable storage medium of claim 10, wherein the medical image and the corresponding transformed medical image are combined using an adaptive mixing algorithm.

15. The non-transitory computer-readable storage medium of claim 14, wherein the adaptive mixing algorithm comprises calculating a weighting coefficient for the medical image and the corresponding transformed medical image.

16. The non-transitory computer-readable storage medium of claim 15, wherein the weighting coefficient is calculated based on one or more parameters quantifying the quantification accuracy of the transformed medical image.

17. The non-transitory computer-readable storage medium of claim 15, wherein the weighting coefficient is calculated based on both an image quality and a quantification accuracy of the medical image and the corresponding transformed medical image.

18. The non-transitory computer-readable storage medium of claim 10, wherein the medical image is Positron Emission Tomography (PET) image.

* * * * *